(12) United States Patent
Anderson et al.

(10) Patent No.: US 10,337,931 B2
(45) Date of Patent: Jul. 2, 2019

(54) SYSTEMS AND METHODS FOR ICING RESISTANT TOTAL AIR TEMPERATURE PROBES WITH AIR JETS

(71) Applicant: Honeywell International Inc., Morris Plains, NJ (US)

(72) Inventors: Morris G. Anderson, Mesa, AZ (US); Zachary Price, Morris Plains, NJ (US); Doug Hollingshead, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 10 days.

(21) Appl. No.: 15/399,611

(22) Filed: Jan. 5, 2017

(65) Prior Publication Data

US 2018/0188118 A1 Jul. 5, 2018

(51) Int. Cl.
*G01K 13/02* (2006.01)
*G01K 1/00* (2006.01)

(52) U.S. Cl.
CPC .............. *G01K 13/02* (2013.01); *G01K 1/00* (2013.01); *G01K 13/028* (2013.01); *G01K 2013/024* (2013.01)

(58) Field of Classification Search
CPC .................................. G01K 1/08; G01K 13/02
USPC .............................. 374/138, 148, 208, 7, 135
See application file for complete search history.

(56) References Cited

U.S. PATENT DOCUMENTS 2,588,840 A * 3/1952 Howland ............... G01K 13/02
  338/25
2,928,279 A * 3/1960 Schober ................. G01K 13/02
  136/209
3,170,328 A 2/1965 Werner et al.
  (Continued)

FOREIGN PATENT DOCUMENTS

EP 1586877 A1 10/2005
EP 1837636 B1 5/2012
  (Continued)

OTHER PUBLICATIONS

"Temperature & Thermocouple Probes", "retrieved Oct. 5, 2016 from http://www.unitedsensorcorp.com/temperature.html", 2015, pp. 1-2.
  (Continued)

*Primary Examiner* — Gail Kaplan Verbitsky
(74) *Attorney, Agent, or Firm* — Fogg & Powers LLC

(57) ABSTRACT

Systems and methods for icing resistant total air temperature probes with air jets are presented. In one embodiment, a probe comprises: a base having a forced air input port; and a body having leading and trailing edges extending from the base, the body comprising: a first interior airflow passage; a temperature sensor positioned within the first airflow passage; a notched intake port at a distal end of the body including an open channel extending into an intake aperture, and a cutaway region defining a recessed second face inset from the first face and exposes the open channel. The intake aperture opens into the first interior airflow passage, the notched intake port comprising air jet ports at a tip of the
  (Continued)

notched intake port; and a heated airflow passage through the body and isolated from the first interior airflow passage, coupling the forced air input port to the air jet ports.

11 Claims, 5 Drawing Sheets

(56) References Cited

U.S. PATENT DOCUMENTS

| | | | |
|---|---|---|---|
| 5,653,538 A * | 8/1997 | Phillips | G01K 13/02 374/135 |
| 6,076,963 A | 6/2000 | Menzies et al. | |
| 6,609,825 B2 | 8/2003 | Ice et al. | |
| 7,174,782 B2 | 2/2007 | Ice | |
| 7,328,623 B2 | 2/2008 | Slagle et al. | |
| 7,357,572 B2 | 4/2008 | Benning et al. | |
| 8,104,955 B2 | 1/2012 | Benning et al. | |
| 8,806,934 B2 * | 8/2014 | Goedel | G01K 13/028 73/204.22 |
| 8,864,370 B2 * | 10/2014 | Dijon | G01K 13/028 244/134 F |
| 9,243,963 B2 | 1/2016 | Thorpe et al. | |
| 9,429,481 B2 | 8/2016 | Agami | |
| 2004/0017763 A1 | 1/2004 | Tawa et al. | |
| 2005/0066722 A1 | 3/2005 | Magnin | |
| 2006/0056489 A1 | 3/2006 | Bernard et al. | |
| 2007/0220984 A1 * | 9/2007 | Slagle | G01K 13/02 73/708 |
| 2008/0285620 A1 * | 11/2008 | Benning | G01K 13/02 374/138 |
| 2009/0154522 A1 * | 6/2009 | Kulczyk | G01K 13/02 374/138 |
| 2013/0022076 A1 | 1/2013 | Dijon et al. | |
| 2014/0169403 A1 * | 6/2014 | Nakamura | G01R 31/311 374/163 |
| 2015/0063414 A1 | 3/2015 | Wigen et al. | |
| 2015/0103863 A1 | 4/2015 | Herman | |
| 2016/0238456 A1 | 8/2016 | Wigen | |
| 2018/0143082 A1 * | 5/2018 | Anderson | G01K 13/028 |

FOREIGN PATENT DOCUMENTS

| | | |
|---|---|---|
| EP | 2863195 | 4/2015 |
| EP | 2863195 A1 | 4/2015 |
| EP | 2866011 A3 | 6/2015 |
| EP | 3056884 A1 | 8/2016 |

OTHER PUBLICATIONS

European Patent Office; "Extended European Search Report from EP Application No. 17201974.7 dated Apr. 9, 2018"; from Foreign Counterpart of U.S. Appl. No. 15/359,442 dated Apr. 9, 2018; pp. 1-9; Published: EP.

European Patent Office; "Extended European Search Report from EP Application No. 18150116.4 dated Apr. 26, 2018"; from Foreign Counterpart of U.S. Appl. No. 15/399,611; dated Apr. 26, 2018; pp. 1-5; Published: EP.

U.S. Patent and Trademark Office, "Office Action from U.S. Appl. No. 15/359,442 dated Oct. 4, 2018", pp. 1-19, Published in: US.

European Patent Office, "Extended European Search Report from EP Application No. 18169377.1 dated Sep. 26, 2018", "from Foreign Counterpart of U.S. Appl. No. 15/583,799", dated Sep. 26, 2018, pp. 1-8, Published in: EP.

U.S. Patent and Trademark Office, "Notice of Allowance", U.S. Appl. No. 15/359,442, dated Apr. 17, 2019, pp. 1-17, Published: US.

* cited by examiner

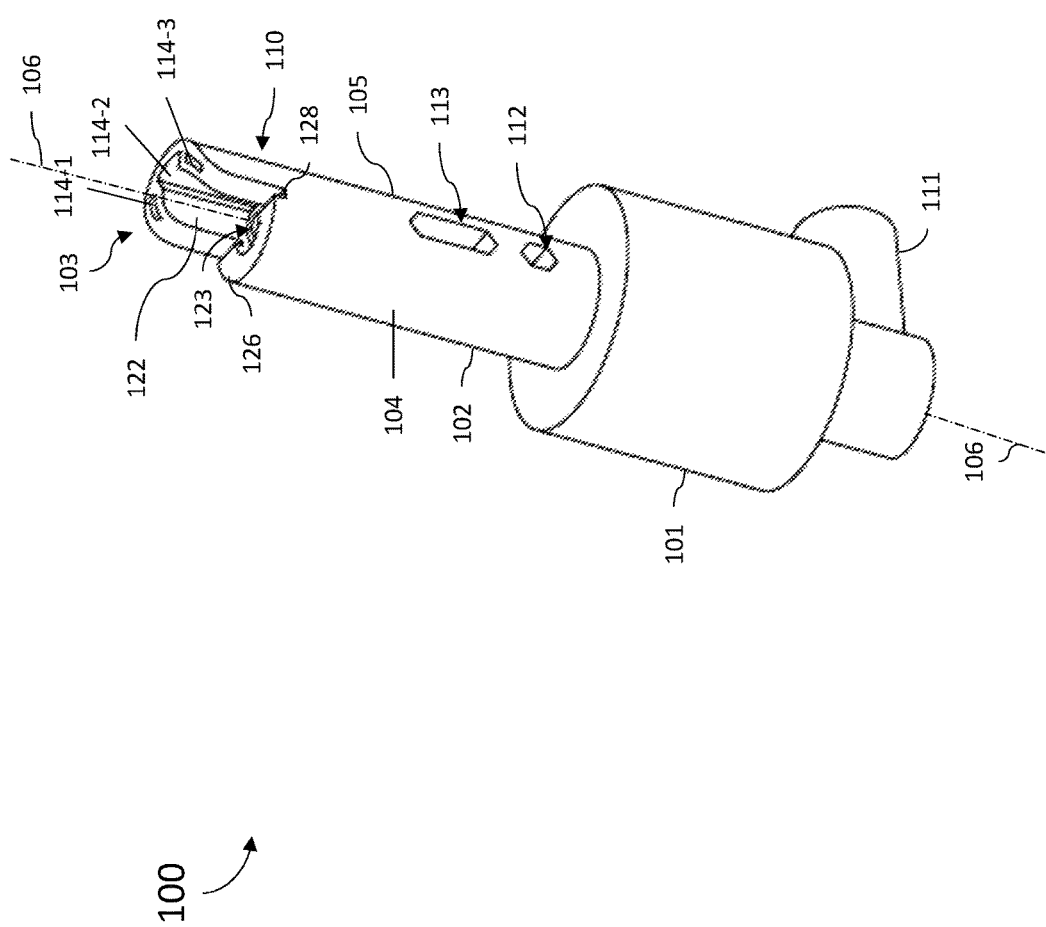

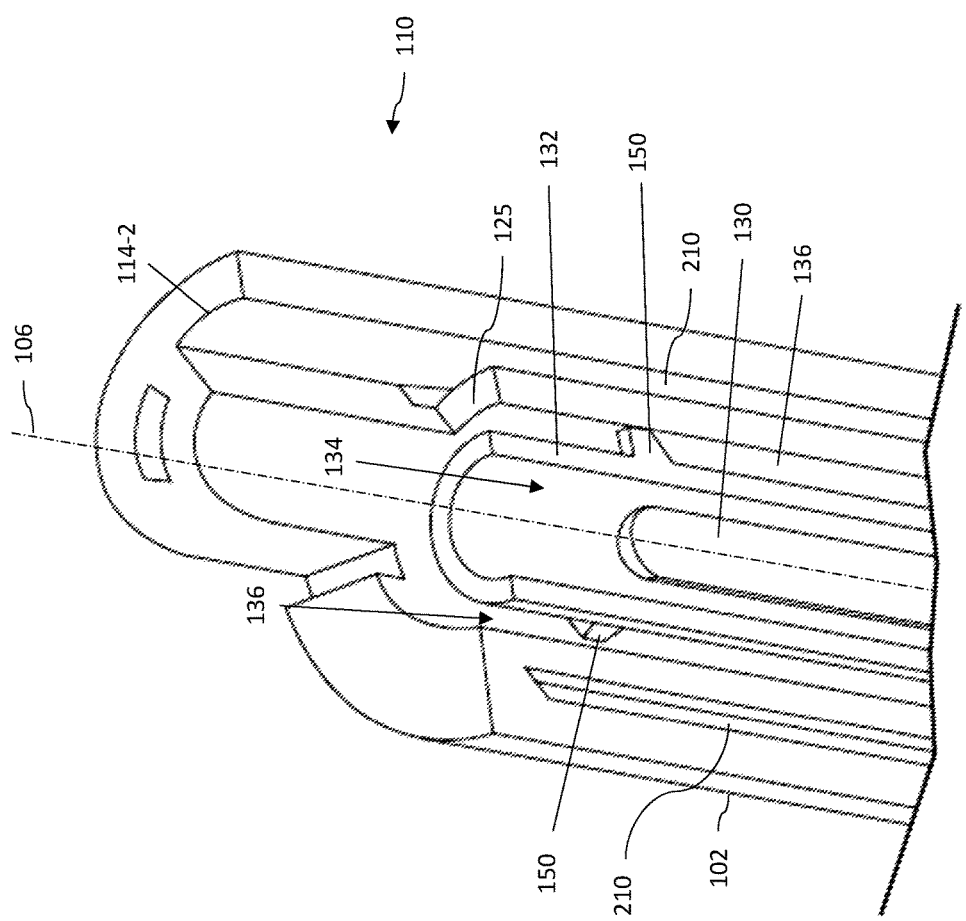

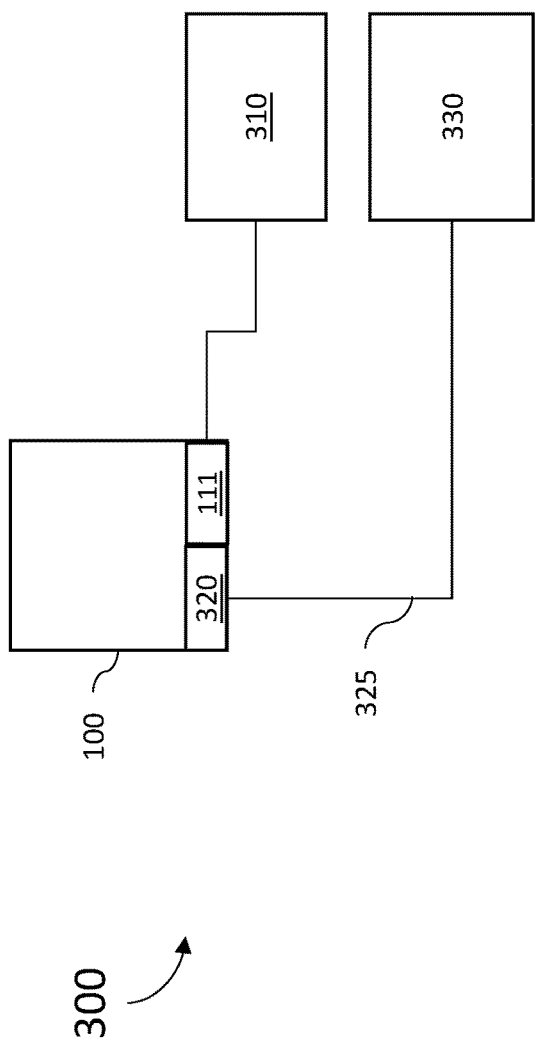

SYSTEMS AND METHODS FOR ICING RESISTANT TOTAL AIR TEMPERATURE PROBES WITH AIR JETS

BACKGROUND

Total air temperature (TAT) measurements are used to properly control various aspects of aircraft operation and the engines that power the aircraft. One problem common in TAT probes in use today is that they are susceptible to icing which can interfere with TAT measurement accuracy. For example, the typical TAT probe comprises a leading edge air scoop that permits ice particles to enter and accumulate inside the probe. This ice accumulation can plug the device. Moreover, the concentration of the ice crystals that such probes are expected to handle without clogging is increasing, as reflecting to recent changes to icing regulations documented in SAE Aerospace Standards. One method for addressing the problem of icing on TAT probes is to heat the probe to melt the ice crystals as they are collected such that the resulting water can be expelled. However, under some circumstances melting or partial melting of the ice crystals may allow the resulting water to flow further within the probe and re-freeze. Moreover, wetting of the probe surface from melted ice can actually create regions on the probe where new ice crystals are more likely to stick rather than bounce off. In addition, the complex surface features found on probes today results in structures that are difficult to heat, or require exorbitant electrical power to remain heated to desired temperatures.

For the reasons stated above and for other reasons stated below which will become apparent to those skilled in the art upon reading and understanding the specification, there is a need in the art for system and methods for icing resistant total air temperature probes.

SUMMARY

The Embodiments of the present disclosure provide methods and systems for icing resistant total air temperature probes and will be understood by reading and studying the following specification.

Systems and methods for icing resistant total air temperature probes with air jets are presented. In one embodiment, a total air temperature data probe comprises: a probe base having a forced air input port; and a probe body having a leading edge and a trailing edge and extending from the probe base along a first axis, the probe body comprising: a first interior airflow passage comprising a first annulus aligned with the first axis; a temperature sensor positioned within the first airflow passage and aligned with the first axis; a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens into the first interior airflow passage, the notched intake port comprising one or more air jet ports at a tip of the notched intake port; and a heated airflow passage through the probe body, the heated airflow passage isolated from the first interior airflow passage and coupling the forced air input port to the one or more air jet ports.

DRAWINGS

Embodiments of the present disclosure can be more easily understood and further advantages and uses thereof more readily apparent, when considered in view of the description of the preferred embodiments and the following figures in which:

FIG. 1 is diagram illustrating a total air temperature probe of one embodiment of the present disclosure;

FIG. 2A is a diagram providing a cutaway cross-sectional view of the notched intake port at a distal end of the probe of FIG. 1; and FIG. 3 is a block schematic diagram of an on-board total air temperature data probe deicing system utilizing the probe of FIG. 1.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure introduce an improved Total Air Temperature (TAT) probe that eliminates the forward facing scoops and associated airflow path through the probe. Instead, with embodiments of the present disclosure utilize a distal end having a notched tip that includes an opening to airflow passages that are normal to the direction of airflow across the probe during flight combined with heated air jets in the notched tip that together work to eliminate direct ingestion of ice crystals into the probe. It should be understood that the present disclosure uses the term "total air temperature" as that term would be understood by those of ordinary skill in the fields of aviation and fluid dynamics. That is, a total air temperature is a measurement of a stream of air if it were brought to rest relative to the aircraft. A total air temperature is distinguished from a static air temperature. More specifically, total air temperature differs from static air temperature as a function of the square of airflow velocity. This relationship may be expressed by Bernoulli's Equation. For example, air which has been slowed due to impacting with the nose of an inflight aircraft will have a higher temperature than air that is flowing without obstruction along the side of an aircraft. Conversion of static air temperatures into total temperature in a sense normalizes temperature measurements by accounting for differences in airflow velocities as temperature measurements are obtained.

Figure 1A:
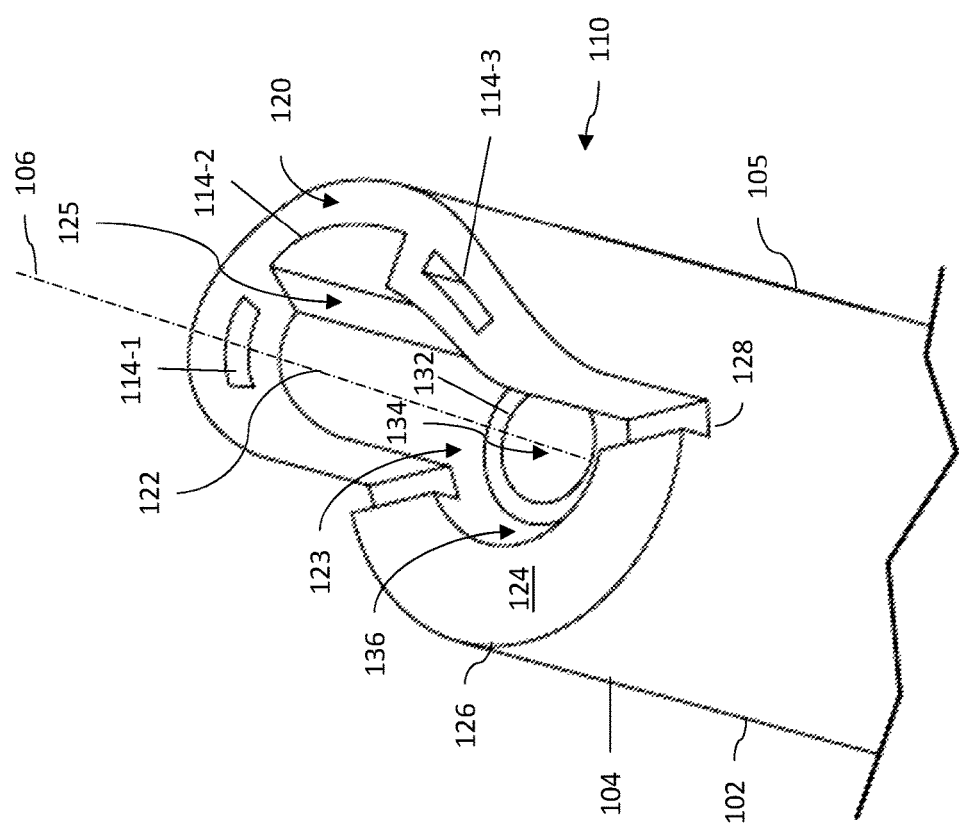
FIG. 1A is a diagram illustrating a notched intake port at a distal end of the probe of FIG. 1.
Figure 2:
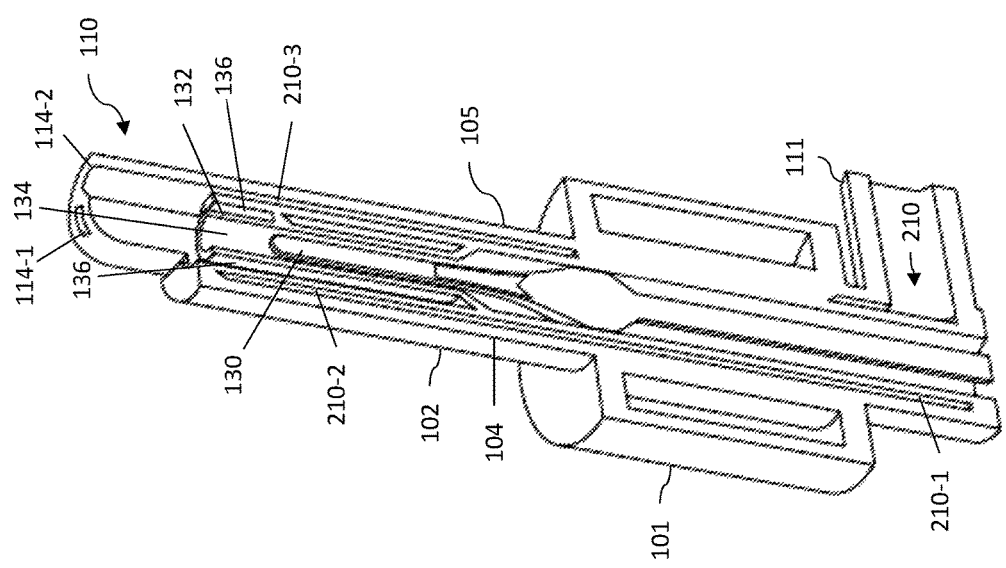
FIG. 2 is a diagram providing a cutaway cross-sectional view exposing interior features of the probe of FIG. 1.

FIGS. 1, 1A, 2 and 2A are diagrams illustrating a TAT probe 100 of one embodiment of the present disclosure. FIG. 1 illustrates an exterior surface profile and features of probe 100 while FIG. 1A presents a magnified illustration of the notched intake port 110 at the distal end 103 of probe 100. FIG. 2 illustrates a cutaway cross-sectional view exposing interior features of probe 100 while FIG. 2A presents a magnified illustration of the interior features of notched intake port 110 at the distal end 103 of probe 100. It should be understood that the various features and elements of probe 100 discussed herein may appear in one or more of the FIGS. 1, 1A, 2 and 2A.

TAT probe 100 comprises a base member 101 and a probe body 102 extending from the base member 101 along a first axis 106, and a forced air input port 111 located in the base 101 of the probe 100. In some embodiments, one or both of the base 101 and probe body 102, or any of the other components of probe 100 discussed herein may be fabricated using Direct Metal Laser Sintering (DMLS).

Base member 101 is used to attach the TAT probe 100 to an aircraft fuselage or other surface of the aircraft and may therefore comprise one or more mounting or fastening features (such as, but not limited to a flange, screws, bolts, tabs, clasps, latches, and the like) known to those of skill in the art for mounting TAT probe 100 to the aircraft. In one embodiment the first axis 106 is aligned normal to a plane of the base member 101. In one embodiment, with TAT probe 100 mounted to an aircraft, a distal end 103 of probe body 102 protrudes away from the aircraft surface to which the base member 101 is mounted, so that it may extend into a free airflow created when the aircraft is in flight. In some embodiments, TAT probe 100 is mounted to an aircraft surface that exposes probe body 102 to an airflow that passes around the air aircraft while in flight. Alternatively, in other embodiments, TAT probe 100 is mounted, for example, to or near an aircraft engine intake and exposed to an airflow that passes into that intake and through the engine. As shown in FIG. 1, probe body 102 further includes a leading edge 104 which defines the portion of the surface of probe body 102 that faces into the airflow when the aircraft is in flight, and a trailing edge 105 which defines the opposing back side of probe body 102 opposite to the leading edge 104. In alternate embodiments, the probe body 102 may be cylindrical, tapered, or of arbitrary shape.

With embodiments of the present disclosure, the distal end 103 comprises a notched intake port 110 with one or more integrated air jet ports (shown separately in FIG. 1 as 114-1, 114-2 and 114-3, and referred to collectively herein as air jet ports 114). The notched intake port 110 comprises an open channel 122 extending inward from a face 120 of the distal end 103 to feed air into a free airstream intake aperture 123 (discussed in more detail below). As shown in the figures, the notched intake port 110 comprises a cutaway region that defines a recessed second face 124 that is inset from the first face 120, and which exposes the open channel 122 at least partially to the leading edge 104. In this configuration, the open channel 122 runs parallel to the axis 106 of the probe body 102, and perpendicular to the direction of free stream airflow.

In some embodiments, the notched intake port 110 may optionally further comprise a slot 128 inset from the recessed face 124 that traverses across at least a portion of the intake aperture 123 perpendicularly to the open channel 122. The slot 128 may be separated from the leading edge 104 by a lip 126. In one embodiment the face 120 of the distal end 103 is oriented normal to the probe axis 106 and/or is a flat surface without any trailing ridge.

The notched intake port 110 converts the airflow that collides with the intake channel 122 into a high pressure region immediately in front of the intake aperture 123. For embodiments that include the slot feature 128, this feature facilitates conversion of the airflow that collides with the intake channel 122 into a stable high pressure vortex immediately in front of the intake aperture 123. Both serve to direct air into the intake aperture 123 and further into the first and second annuluses 134 and 136. Unheated air is directed into annulus 134 by the stable vortex and/or high pressure region while air that is partially heated by contact with the probe body 102 is drawn into annulus 136. This prevents the heated air from entering at annulus 134, enhancing the ability to measure the proper total temperature of the air with this probe 100. When the slot feature 128 is provided, it may be oriented perpendicular to the to the in-flight airflow direction (i.e., normal to the plane that intersects the leading edge 104 and trailing edge 105). In one embodiment, the slot feature 128 is cut into the recessed second face 124 to traverse across approximately 20%-50% of the area of the intake aperture 123. In some embodiments, at least one of the air jet ports 114 comprises a cutout section 125 exposing the open channel 122 to at least part of a heated air jet produced from that air jet port 114.

When an aircraft with probe 100 is in flight, the leading edge 104 is oriented into the direction of travel so that a free airstream flows around probe 100. A portion of the airstream is directed into the intake aperture 123 and travel along a plurality of interior airflow passages within the body 102 of probe 100. In one embodiment, a first airflow passage directs air entering intake aperture 123 through a first annulus 134, across a temperature sensor element 130, and then out of the probe body 102 from one or more exhaust ports 112. In one embodiment, the first annulus 134 may be formed between the sensor element 130 and a tubular heat shield 132 as shown in FIG. 2. For example, as shown in FIG. 2 the tubular heat shield 132 is open to the intake aperture 123 at its first end and the temperature sensor element 130 positioned within the tubular heat shield 132 at its second end. Air entering through the intake aperture 123 and into the first end of the tubular heat shield 132 thus flows over the temperature sensor element 130 before exiting the one or more exhaust ports 112. It should be understood however that the tubular heat shield 132 is optional and that in some embodiments, the first annulus 134 may instead be formed between the sensor element 130 and an internal surface of body 102.

The temperature sensor element 130 is a device that outputs an electrical signal that varies as a function of air temperature it senses. The resulting electrical signal from probe 100 may be sampled or otherwise converted into data representing total air temperature measurements which may be provided to various onboard avionics for various purposes. In one embodiments, the TAT probe 100 includes a set of wires coupled to the temperature sensor element 130 that extend from the temperature sensor element 130 through the base member 101 so that the temperature sensor element 130 can be connected to the onboard avionics.

In one embodiment, the tubular heat shield 132 may comprise a sheath of insulating material that blocks heat radiated by the heated probe body 102 from radiating to either the temperature sensor element 130 or the air flow in the annulus 134 being measured by temperature sensor element 130. It should be noted that although heat shield 132 is described as being "tubular," this description should not be interpreted to infer that it necessarily has a round or circular cross-section. Heat shield 132 may be implemented as a sheath having any other cross sectional shape, and may vary in size along different portions of its length. For example, in one embodiment, the tubular heat shield 132 and the first annulus 134 which its interior defines, may vary in shape to follow a contour of the temperature sensor element 130. The tubular heat shield 132 may be secured or stabilized within the probe body 102 by one or more standoffs (for example, as shown at 150 in FIG. 2A) that couple the tubular heat shield 132 to the probe body 102 to prevent shifting or rattling of the tubular heat shield 132, and/or to prevent a dislodged tubular heat shield 132 from obstructing either the first or second interior airflow passages.

In some embodiment, a second internal airflow passage may be incorporated within probe body 102 for the purpose of cooling the tubular heat shield 132. That is, another portion of the airstream directed into the intake aperture 123 is further direct through a second annulus 136, across the exterior surfaces of heat shield 132, and then out of the probe body 102 from one or more exhaust ports 113. The second annulus 136 is thus formed between the tubular heat shield 132 and an interior wall of the probe body 102 and as such defines a passage where air flow across the exterior of the tubular heat shield 132. In such an embodiment, the free stream airflow collides with the notched intake port 110 and enters the intake aperture 123. The airstream entering intake aperture 123 splits between the first annulus 134 and the second annulus 136. The cool air flowing around the outside of the heat shield 132 in the second annulus keeps the heat shield 132 cool. Air that has thusly absorbed heat from the heat shield exhausts out from the probe body 102 at the exhaust ports 113. Air entering the first annulus 134 is directed across the temperature sensor element 130 so that total air temperature measurements may be obtained. After passing across the temperature sensor element 130, this airstream exhausts out from probe at exhaust ports 112. As a result, the temperature sensor element 130 within the probe body 102 is kept cool and at the same temperature as the free stream airflow enter into the intake aperture 123.

The exhaust ports 112 and 113 may be positioned along a side of the probe body 102 where the velocity of passing air causes the air pressure at the exhaust ports 112 and 113 to be less than the air pressure at the leading edge 104 and less than the air pressure at the intake aperture 123. More specifically, during flight a high static pressure stagnation zone develops within the notched intake port 110 at the intake aperture 123. In some embodiments, an airflow vortex forms at this location facilitating the high static pressure stagnation zone. Conversely, as the balance of the free airflow stream flows around the outside of the probe body 102, a low static pressure zone is created at the exhausts ports 112 and 113 positioned on the sides for the probe body 102. The pressure difference between the intake aperture 123 and the exhaust ports 112, 113 results in a natural airflow that moves air though the first annulus 134 and the second annulus 136 within the probe body 102. In some embodiments, the free airflow stream may be flowing at a speed on the order of 0.2 to 0.9 mach. In other embodiments, the exhaust ports may be positioned elsewhere such as but not limited to the trailing edge 105 side of probe body 102.

As already mentioned above, embodiments of the present disclosure further utilize hot air jets from one or more air jet ports 114 integrated into the tip of the notched intake port 110. The hot air jets serve to sweep away ice crystals that may attempt to collect on the tip for added protection, but this same heated and pressurized airflow also serves to heat the length of the probe body 102.

To generate the heated air jets, an independent forced air flow is supplied into the forced air input port 111 located in the base 101 of the probe 100. Such a configuration is illustrated in FIG. 3 by the block schematic diagram at 300 where the forced air input port 111 of a TAT probe 100 is coupled to at least one on-board forced air supply device 310, such as but not limited to an air compressor. For example, in some embodiments, bleed air from a jet aircraft engine compressor may be available and coupled to the forced air input port 111 to provide a pressurized heated air supply to heat the probe body 102 and produce the heated air jets from air jet ports 114. Such an engine compressor may be expected to deliver to the forced air input port 111 a supply of pressurized heated air at a temperature approximately in the range of 500 to 1000 degrees Fahrenheit depending on the engine design. Alternately, forced air supply device 310 may comprise a device that provides a non-heated pressurized air supply which is then run past a heating element or through a heat exchanger prior to delivery to the forced air input port 111. In still another embodiment, a non-heated pressurized air supply 310 may deliver the forced air input port 111 while an optional heating element 320 within the base 101 or probe body 102 of probe 100 is used to heat that forced air supply. For example, FIG. 3 illustrates a heating element 320 internal to probe 100, which may be located with within the base 101 or probe body 102. Heating element 320 may comprise a restive heating element comprising a wire, cable, or film that is dissipates heat generated by the flow of electrical current. In such embodiments, the TAT probe 100 can include a set of wires 325 coupled to the heating element 320 that extend from the heating element 310 through the base member 101 so that the heating element 310 can be connected to onboard electrical power and control circuitry 330.

Regardless of how it is produced, heated high-pressure air is routed through yet another internal airflow passage to heat the thermal mass of the probe body 102 including the notched intake port 110. The heated high-pressure air flows from the bottom of the probe body 102 and travels a separate air passage 210 within the probe body 102 before exiting from the air jet ports 114. This separate air passage is referred to herein as the heated airflow passage 210.

The cross-sectional view of FIGS. 2 and 2A illustrate an example embodiment of one such heated airflow passage 210. In this embodiment, the heated airflow passage 210 directs the high-pressure air from the forced air input port 111 towards the leading edge 104 (shown at 210-1) and to the notched intake port 110 (shown at 210-2). In some embodiments, the air may travel up the leading edge 104 side of the probe body 102 and towards the notched intake port 110 (shown at 210-2). With this path, the heated airflow passage 210 thus directly supply's heat to the region of the probe body 102 that impacts with super cooled water droplets or ice crystals in the free air flow. The heated airflow passage 210 next leads the heated high-pressure air around the circumference of the intake aperture 123 towards the trailing edge 104 side of the body probe 102 (as shown at 210-3), and then out through the air jet ports 114 at the tip of the notched intake port 110.

In the various embodiments of the present disclosure, the notched intake port 110 may comprise just one, or alternatively multiple, air jet ports 114. Referring back to the embodiment shown in FIGS. 1 and 1A, the notched intake port 110 in this embodiment comprises two lateral air jet ports (shown at 114-1 and 114-3) and a central air jet port (shown at 114-2). The lateral air jet ports 114-1, 114-3 are located on either side of the tip of the notched intake port 110 and primarily serve to heat the tip of the notched intake port 110 and provide a port for the heated airflow passage 210 to exhaust from the probe body 102. As a secondary function, these pressurized heated air jets from the lateral air jet ports 114-1, 114-3 will also serve to melt and/or blow away ice that accumulates on the notched intake port 110.

The central air jet port 114-2 includes a cutaway region 125 that connects the central air jet port 114-2 with the open channel 122 of the notched intake port 110. In such an embodiment, ice crystals that enter into the open channel 122 region of the notched intake port 110 are blown off the probe 101 by the high-pressure air jet emitted through the central air jet port 114-2 cutaway region 125, keeping ice accumulation that could block the intake port 123 from forming. Note that the air jet produced from the central air jet port 114-2 cutaway region 125 is a counter-directed jet with respect to the free-air stream that entering into the intake port 123. That is, the air jet produced from the central air jet port 114-2 cutaway region 125 is directed away from the intake port 123 so that heated air from the air jets 114 are not introduced into intake port 123 thus avoiding biasing of the temperature sensor 130. It should also be noted that the cutaway region 125 is an optional feature and that the central air jet port 114-2 need not include the cutaway region 125 in all embodiments. As such, with the embodiments presented herein, ice accumulation may be dissuaded or mitigated without the ice needing to travel through the internal annuluses 134 or 136 of the probe body 102 to clear the ice from the probe.

EXAMPLE EMBODIMENTS

Example 1 includes a total air temperature data probe, the probe comprising: a probe base having a forced air input port; and a probe body having a leading edge and a trailing edge and extending from the probe base along a first axis, the probe body comprising: a first interior airflow passage comprising a first annulus aligned with the first axis; a temperature sensor positioned within the first airflow passage and aligned with the first axis; a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens into the first interior airflow passage, the notched intake port comprising one or more air jet ports at a tip of the notched intake port; and a heated airflow passage through the probe body, the heated airflow passage isolated from the first interior airflow passage and coupling the forced air input port to the one or more air jet ports.

Example 2 includes the probe of examples 1, wherein a path of the heated airflow passage directs pressurized air from the forced air input port towards the leading edge of the probe body and then to the notched intake port, around a circumference of the intake aperture and towards the trailing edge of the body probe, and then out through the one or more air jet ports at the tip of the notched intake port.

Example 3 includes the probe of any of examples 1-2, the probe body further comprising:
a tubular heat shield defining an exterior wall of at least part of the first interior airflow passage, wherein the temperature sensor is positioned within the tubular heat shield.

Example 4 includes the probe of example 3, the probe body further comprising: a second interior airflow passage comprising a second annulus aligned with the first axis; and wherein the second annulus is defined by a space between the tubular heat shield and an interior wall of the probe body and the tubular heat shield separates the first annulus from the second annulus.

Example 5 includes the probe of example 4, wherein the intake aperture opens to both the first annulus and the second annulus.

Example 6 includes the probe of any of examples 4-5, wherein the first interior airflow passage and the second interior air-flow passage are concentric tubular airflow passages.

Example 7 includes the probe of any of examples 1-6, the probe further comprising: at least one heating element positioned within the probe and configured to heat air flowing through the heated airflow passage.

Example 8 includes the probe of any of examples 1-7, wherein the notched intake port further comprises a slot inset from the recessed second face that traverses across at least a portion of the intake aperture perpendicularly to the open channel.

Example 9 includes the probe of any of examples 1-8, wherein at least a first air jet port of the one or more air jet ports includes a cutaway region that connects the first air jet port with the open channel of the notched intake port.

Example 10 includes the probe of any of examples 1-9, further comprising a plurality of exhaust ports positioned along a side of the probe body, wherein the first internal airflow passage and the second internal airflow passage are coupled to the plurality of exhaust ports.

Example 11 includes the probe of any of examples 1-10, wherein the open channel runs parallel to the axis of the probe body.

Example 12 includes an on-board total air temperature data probe deicing system, the system comprising: an on-board pressurized air source; a total air temperature probe, the total air temperature probe comprising: a probe base having a forced air input port coupled to the on-board pressurized air source; and a probe body having a leading edge and a trailing edge and extending from the probe base along a first axis, the probe body comprising: a first interior airflow passage comprising a first annulus aligned with the first axis; a temperature sensor positioned within the first airflow passage and aligned with the first axis; a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens into the first interior airflow passage, the notched intake port comprising one or more air jet ports 114 at a tip of the notched intake port 110; and a heated airflow passage through the probe body, the heated airflow passage isolated from the first interior airflow passage and coupling the forced air input port to the one or more air jet ports.

Example 13 includes the system of example 12, wherein the probe base is mounted to an exterior surface of an aircraft fuselage.

Example 14 includes the system of any of examples 12-13, on-board pressurized air source comprises a bleed air source from a jet aircraft engine compressor.

Example 15 includes the system of any of examples 12-14, further comprising at least one heating element positioned between the on-board pressurized air source and the forced air input port and configured to heat air supplied to the forced air input port.

Example 16 includes the system of any of examples 12-15, further comprising at least one heating element positioned within the total air temperature probe and configured to heat air passing through the heated airflow passage.

Example 17 includes the system of any of examples 12-16, wherein a path of the heated airflow passage directs pressurized air from the forced air input port towards the leading edge of the probe body and to the notched intake port, around a circumference of the intake aperture and towards the trailing edge of the body probe, and then out through the one or more air jet ports at the tip of the notched intake port.

Example 18 includes the system of any of examples 12-17, the probe body further comprising: a tubular heat shield defining an exterior wall of at least part of the first interior airflow passage, wherein the temperature sensor is positioned within the tubular heat shield.

Example 19 includes the system of example 18, the probe body further comprising: a second interior airflow passage comprising a second annulus aligned with the first axis; and wherein the second annulus is defined by a space between the tubular heat shield and an interior wall of the probe body and the tubular heat shield separates the first annulus from the second annulus; and wherein the intake aperture opens to both the first annulus and the second annulus.

Example 20 includes the system of any of examples 12-19, wherein at least a first air jet port of the one or more air jet ports includes a cutaway region that connects the first air jet port with the open channel of the notched intake port.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A total air temperature data probe, the probe comprising:
    a probe base having a forced air input port; and
    a probe body having a leading edge and a trailing edge and extending from the probe base along a first axis, the probe body comprising:
        a first interior airflow passage comprising a first annulus aligned with the first axis;
        a temperature sensor positioned within the first interior airflow passage and aligned with the first axis;
        a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens into the first interior airflow passage, the notched intake port comprising one or more air jet ports at a tip of the notched intake port; and
        a heated airflow passage through the probe body, the heated airflow passage isolated from the first interior airflow passage and coupling the forced air input port to the one or more air jet ports.

2. The probe of claim 1, wherein a path of the heated airflow passage directs pressurized air from the forced air input port towards the leading edge of the probe body and then to the notched intake port, around a circumference of the intake aperture and towards the trailing edge of the body probe, and then out through the one or more air jet ports at the tip of the notched intake port.

3. The probe of claim 1, the probe body further comprising:
    a tubular heat shield defining an exterior wall of at least part of the first interior airflow passage, wherein the temperature sensor is positioned within the tubular heat shield.

4. The probe of claim 3, the probe body further comprising:
    a second interior airflow passage comprising a second annulus aligned with the first axis; and
    wherein the second annulus is defined by a space between the tubular heat shield and an interior wall of the probe body and the tubular heat shield separates the first annulus from the second annulus.

5. The probe of claim 4, wherein the intake aperture opens to both the first annulus and the second annulus.

6. The probe of claim 4, wherein the first interior airflow passage and the second interior air-flow passage are concentric tubular airflow passages.

7. The probe of claim 1, the probe further comprising:
    at least one heating element positioned within the probe and configured to heat air flowing through the heated airflow passage.

8. The probe of claim 1, wherein the notched intake port further comprises a slot inset from the recessed second face that traverses across at least a portion of the intake aperture perpendicularly to the open channel.

9. The probe of claim 1, wherein at least a first air jet port of the one or more air jet ports includes a cutaway region that connects the first air jet port with the open channel of the notched intake port.

10. The probe of claim 1, further comprising a plurality of exhaust ports positioned along a side of the probe body, wherein the first internal airflow passage and the second internal airflow passage are coupled to the plurality of exhaust ports.

11. The probe of claim 1, wherein the open channel runs parallel to the axis of the probe body.

* * * * *

UNITED STATES PATENT AND TRADEMARK OFFICE
CERTIFICATE OF CORRECTION

PATENT NO.         : 10,337,931 B2
APPLICATION NO.    : 15/399611
DATED              : July 2, 2019
INVENTOR(S)        : Anderson et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 87 days.

Signed and Sealed this
Thirty-first Day of December, 2019

Andrei Iancu
*Director of the United States Patent and Trademark Office*